United States Patent [19]
Kato

[11] Patent Number: 5,641,446
[45] Date of Patent: Jun. 24, 1997

[54] METHOD OF PRODUCING TAG PIN ASSEMBLY

[75] Inventor: Masami Kato, Nagoya, Japan

[73] Assignee: Toska Co., Ltd., Tokyo, Japan

[21] Appl. No.: 512,642

[22] Filed: Aug. 8, 1995

Related U.S. Application Data

[63] Continuation of Ser. No. 135,975, Oct. 14, 1993, abandoned.

[30] Foreign Application Priority Data

Nov. 5, 1992 [JP] Japan ............... 4-295832

[51] Int. Cl.$^6$ .................. B29B 7/00; B29C 45/00
[52] U.S. Cl. .......... 264/328.12; 264/291; 264/328.1; 264/328.8; 425/542
[58] Field of Search ............... 264/291, 297.2, 264/328.8, 328.12, 243; 425/572, 588, 573, 542

[56] References Cited

U.S. PATENT DOCUMENTS

| | | | |
|---|---|---|---|
| 2,672,653 | 3/1954 | Simpkins et al. | 425/572 |
| 3,380,122 | 4/1968 | Kirk | 264/291 |
| 4,198,370 | 4/1980 | Suzuki | 264/291 |
| 4,255,111 | 3/1981 | Suzuki | 425/383 |
| 4,429,437 | 2/1984 | Paradis | 24/150 FP |

*Primary Examiner*—Christopher A. Fiorilla
*Attorney, Agent, or Firm*—Nikaido Marmelstein Murray & Oram LLP

[57] ABSTRACT

In a method of molding a tag pin assembly P having a plurality of tag pins p each including a head 1, a filament portion 2 and a transverse rod portion 3, and implanted on one connecting rod 5 via connecting portions 4, the method produces a tag pin assembly under a ultra-close contact state by allowing balanced pressures to act on thin wall surfaces between adjacent cavities by supplying a molten resin through a main runner portion 30 connected to an injection molding machine, one first sub-runner portion 31 and a U-shape branched second sub-runner portion 32 to cavities of four tag pins 4 for one second sub-runner portion 32 in a cascade system by halving the molten resin.

7 Claims, 7 Drawing Sheets

METHOD OF PRODUCING TAG PIN ASSEMBLY

This application is a continuation of application Ser. No. 08/135,975 filed Oct. 14, 1993 now abandoned.

BACKGROUND OF THE INVENTION

This invention relates to an improvement in a tag pin assembly used for attaching a price tag to goods, that is, an assembly of tag attachers. More particularly, the present invention relates to a method of producing accurately and industrially a tag pin assembly having tag pins densely disposed with small gaps between them.

Tag pin is a member for attaching a price tag to goods and is also referred to as a "tag attacher". It comprises a transversely elongated, rectangular, sheet-like head, a filament portion so extended from the center of the head as to orthogonally cross the head and a transverse rod portion so disposed at the end portion of the filament portion as to orthogonally cross the filament portion, and has an H-shape as a whole. About 50 to about 200 of such tag pins are implanted to one connecting rod through connecting portions to form a tag pin assembly. Such a tag pin assembly is integrally molded from a thermoplastic synthetic resin having molecular orientation such as nylon or polypropylene, and thereafter the filament portions are extended, their diameter is reduced as thin as a filament, and strength as well as flexibility are improved to provide a finished product.

A large number of proposals have been made for the tag pins of this kind as described, for example, in Japanese Patent Publication Nos. 45-37100 and 52-20240.

The invention of Japanese Patent Publication No. 45-37100 relates to technique of so-called "inter-mold stretching", which utilizes a mold for the purpose of molding and as a clamping device as a part of stretching machine. A crude material of a tag pin assembly immediately after molded by injection-molding a synthetic resin such as a nylon inside the mold has a filament portion which is not yet stretched, its diameter is considerably great, its molecules have large proportions of amorphous portions, and its strength is not sufficiently high. Accordingly, such a tag pin cannot yet be utilized as the tag pin. Accordingly, this crude material is loaded into a stretching machine and the filament portion is stretched by 3 to 4 times, so that it becomes as thin as bristles and its strength and tenacity are improved. In this way, the finished product can be obtained.

However, the method which withdraws the crude material of the molded tag pin assembly from the mold and then loads it to the stretching machine so as to stretch the filament portion requires two process steps of the molding step and the stretching step, and the crude material of the tag pin assembly having a delicate structure must be transferred between these two process steps. Accordingly, defective products are likely to occur. In the actual production process of the tag pins, however, the machining speeds and the control conditions are entirely different between the molding step and the stretching step. For this reason, machining is mostly carried out by installing the respective machines for the respective steps in different plants.

In the invention of this Japanese Patent Publication No. 45-37100, the mold used for molding is split into upper and lower units (or into the right and left units) and is further split into the right and left units (or into the upper and lower units) at the intermediate portion of the filament portion from the parting line, so that the same mold used for molding can be used consecutively for stretching. In other words, the reference invention uses, in principle, a 4-split mold, allows the other mold to move with respect to one of the molds which clamps the filament portion, and consecutively stretches the filament portion while the crude material of the tag pin assembly produced by the molding step is kept retained inside the mold. This reference invention provides an excellent apparatus that can produce a delicate tag pin assembly highly efficiently in that the crude material of the tag pin assembly can be processed to a finished product without withdrawing it from inside the mold.

On the other hand, the invention of Japanese Patent Publication No. 52-20240 provides a "connecting pin" which can prevent entanglement of heads of a tag pin assembly. As described above, in the tag pin assembly, a large number of tag pins are implanted to one connecting rod through connecting portions, and the tag pin assembly has a comb-shape as a whole. Generally, the heads are separated from one another and can move individually and independently.

When packaging or using the tag pin assembly, a plurality of tag pin assemblies are stored in one box. Under this state, however, the heads entangle with one another, and they must be separated one by one when they are loaded into a fitting machine and are used in practice. This reference invention provides an excellent solution to this problem by connecting the heads to one another by an easily tearable connecting member and integrating the heads into a mass.

As can be seen by referring to the accompanying drawings of this Japanese Patent Publication No. 52-20240, cavities engraved in a mold are arranged transversely with a sufficient gap as wide as the thickness of each head. The tag pin assembly is molded from a thermoplastic resin such as nylon or polypropylene, and an injection molding pressure as high as about 700 to about 1,500 kg/cm$^2$ is necessary for this molding step.

Accordingly, walls capable of withstanding this high pressure are necessary between the cavities for molding the individual tag pins. More specifically, in the case of a mold wherein cavities for a tag pin assembly are engraved in a mold steel stipulated in JIS SKD61, the gaps between the tag pins, that is, the thickness of the walls defining the chambers for storing a resin during molding, poses a problem.

In a conventional mold, one gate is provided to one connecting rod. Therefore, the resin for molding 50 to 200 tag pins is supplied through one gate and one connecting rod.

For this reason, a minimum thickness of the walls of about 1.0 to about 1.2 mm is necessary lest the walls defining the cavities are broken even when any small pressure difference exists between the molten resin packed into the cavities of the tag pins adjacent to one another. Such a limitation makes it extremely difficult to remarkably reduce the pitch of the tag pins.

To facilitate packaging and transportation of the tag pin assemblies and their loading into and operation of the fitting machine, on the other hand, the tag pin assembly must be made compact in size by reducing the gap between the heads and that between the transverse rod portions. In other words, a tag pin assembly having a dense and delicate structure is necessary, and various attempts have been made in this point. As described above, however, the gap of about 1.0 to 1.2 mm is necessary between the individual cavities for molding the tag pin assembly, or in other words, the thickness of the walls defining the cavities, is necessary. If the walls are thinner than the value described above, they are highly likely to be broken by the pressure of the injected resin and even if they are not broken, they cannot withstand repetition of stresses applied many times, and durability is therefore low.

Generally, a mold used industrially used for producing the tag pin assembly must withstand at least 10,000,000 shots from the aspect of the production cost of the mold.

Another problem is as follows. The connecting rod connecting 50 to 200 tag pins into the assembly is an important member corresponding to a runner portion through which large quantities of the resin flows during molding, and the resin injected for this connecting rod is branched and supplied into the cavities for the individual tag pins. In other words, the molten synthetic resin is supplied from one gate to one runner portion, is branched from the runner portion and is then supplied into the cavities for molding the individual tag pins.

In the case of the conventional tag pin assembly which is sold in quantities and wherein the tag pins are disposed on one connecting rod with a pitch of about 2 mm, the molten resin tends to flow substantially uniformly into the cavities for the individual tag pins. In other words, it has been confirmed that insufficiency of the molten resin in part of filament portions hardly occurs, and a defect ratio is low.

However, when the gap between the tag pins is gradually decreased so as to make the tag pin assembly more compact in size, a delicate unbalance occurs in the amount of the resin flowing into the filament portions, defects occur at the filament portions and in some case, cut-off of the supply of the resin occurs.

FIGS. 13, 14, 15 and 16 of the accompanying drawings correspond to FIGS. 5, 6, 7 and 8 of Japanese Patent Publication No. 37100/1971, respectively. The conventional method of producing the tag pin assembly by the "inter-mold stretching method" will be briefly explained with reference to these drawings.

The mold comprises four units, that is, upper molds 10, 10a and lower molds 11, 11a, and is split to the right and left from the parting line PL in such a manner that the other set of molds 10a, 11a can be moved with respect to one of the sets of the molds 10, 11 and stretch the filament portions 2. During molding, the split molds shown in FIGS. 13 and 14 gather together and define the cavity of the tag pin assembly P of the tag pins p each comprising the head 1, the filament portion 2, the transverse rod portion 3 and the connecting rod 5.

To begin with, while the four molds are gathered as shown in FIG. 14, the molten resin is injected into the cavity and the crude material of the tag pin assembly P is molded. Next, as shown in FIG. 15, the molds 10a, 11a are separated from the parting line PL and are moved in the transversely direction while the molds 10 and 11 are kept fixed as shown in FIG. 15, so that the filament portions 2 are stretched to a predetermined length and made thinner, and the strength is improved.

Next, ejector pins 12, 12a are brought into contact with both ends of the head 1 and other ejector pins 13, 13a are brought into contact with both ends of the transverse rod portion 3 as shown in FIG. 16. While the crude material of the tag pin assembly P is kept adhering to the lower mold side in this way, the upper molds 10, 10a are raised and the split faces in the vertical direction of the molds 11, 11a, 10, 10a are opened.

The ejector pins 12a, 13a provided to the lower mold side 11, 11a are protruded upward and the tag pin assembly P is withdrawn from the mold. In this way, molding and stretching steps of the tag pin assembly P are completed. Thereafter, portions unnecessary for the products such as a spool, a runner bar, etc, are automatically cut off by an ordinary post-processing method, and only the tag pin assembly P is transferred to a next step.

Next, the problems with this process will be explained in further detail with reference to FIGS. 11 and 12.

In the cavity C, each tag pin p comprising the head 1, the filament portion 2 and the transverse rod portion 3 is so disposed at to orthogonally cross the connecting rod 5 through the connecting portion 4 in match with the crude material of the tag pin assembly P (under the state where the filament portion 2 is not yet stretched). The cavity C has a comb-shape as a whole. The center portion of this connecting rod 5 and the main runner portion 6 are connected by a sub-runner portion 7, and this main runner portion 6 is connected to the spool 8 as a main flow passage of the resin injected from an injection molding machine.

In the ordinary mold, about four cavities C are disposed on each side of this main runner portion 6 and eight crude materials of the tag pin assemblies P can be molded at one time.

FIG. 12 is a sectional side view of the principal portions of this mold. The ejector pins 12, 12a, 13, 13a are disposed at both ends of the head 1 molded between the upper mold 10 and the lower mold 11 and at both ends of the transverse rod portion 3 molded between the upper mold 10a and the lower mold 11a, and these pins are constituted in such a fashion as to simultaneously project the tag pin assemblies P in the mass form after molding from the cavities and to withdraw from the mold with the main runner 6 and the spool 8 by utilizing the piston motion of a cylinder device (see FIG. 14) provided to the upper and lower molds.

The molds 10, 10a, 11, 11a are constituted in such a manner that they are separated from the parting line PL, and one of the sets of them can instantaneously move by a predetermined distance from the other set when the filament portions 2 are stretched as indicated by an arrow.

The molten resin J discharged from the injection molding machine, not shown in the drawings, flows into portions indicated by arrows a, b, d and d' through the spool 8 and the main runner 6, altogether flows into the cavities for molding the tag pins p through the connecting rod 5 as indicated by arrows e and f, and is charged while spreading as a whole.

When the gap between the tag pins p is as wide as about 2 mm as in the crude material of the conventional tag pin assembly, the resin flows correctly into the cavities C of the tag pins $p_1, p_2, \ldots, p_n$. Therefore, molding defects such as insufficiency of the resin do not occur and the filament portions 2 can be molded into a predetermined dimension. Accordingly, even when these filament portions 2 are altogether stretched, there does not occur the problem that a part of them is broken and effective products occur.

Recently, attempts have been made to make the tag pin assembly more compact as a whole by reducing the length of the tag pin assembly (that is, the length of the connecting portion 5).

They are primarily directed to the following points. First, the room for intrusion of other heads 1 is eliminated by reducing the gap between the heads 1 to a value smaller than the thickness of the heads 1 so as to prevent entanglement of the heads 1. Next, handling property of the tag pin assembly is improved by minimizing the portion of the tag pin assembly, which protrudes from the fitting machine and is unstable, when it is loaded into the fitting machine. Third, material is saved by reducing the length of the connecting rod. To accomplish these objects, a tag pin assembly under a ultra-close contact state or a tag attacher of a ultra-close contact type must be developed.

This ultra-close contact tag pin assembly has a by far closer and more delicate structure than the conventional tag pin assembly, and to produce such a ultra-close contact tag pin assembly, the cavities for molding the tag pins $p_1, p_2, \ldots, p_n$ must be disposed by far more closely to one another than the conventional mold for molding the conventional tag pin assembly.

To attain this object, the problem exists in that the "thickness of the wall" defining the cavity of the individual tag pins p must be reduced to a level which is never expected in the past. However, as already described, the pressure of the high pressure molten resin repeatedly acts on the cavity, and there is a delicate difference between the flows of the molten resin charged on both sides of the wall partitioning the cavities. Accordingly, if even a slight delay exists in the flow of the resin on one of the sides of the wall, the pressure becomes higher more quickly in one of the cavities than in the other, though limitedly. Since the flow of the molten resin is rapid, the high pressure acts impulsively on this wall surface if such a pressure difference occurs.

The time in which the molten resin is injected into the cavity is very short, and it is very important to charge the resin simultaneously and uniformly into a large number of cavities. If the balance can be established somehow in the flowing condition of the resin in this case, it is possible to reduce the gaps between the tag pins by remarkably reducing the thickness of the walls partitioning the cavities. Whether or not this problem can be solved is the pressing problem for those engaged in this field of art.

In the case of the conventional tag pin assembly, the molten resin is supplied to one connecting rod from one sub-runner portion as shown in FIG. 13 of the aforementioned Japanese Patent Publication No. 37100/1971 and in FIG. 11 of the accompanying drawings. Therefore, a delicate difference occurs in the packing speed of the molten resin to the cavities between the portions near and far from the inflow port of the resin, and a difference occurs between pressures acting on both sides of the wall defining the cavity. However, no substantial problem has occurred such as breakage of the wall of the cavity because the gap between the tag pins is great.

The reduction of the thickness of the wall of the cavity means the reduction of the pitch of the tag pins and the formation of a more delicate tag pin assembly, and makes it possible to produce a ultra-close contact tag pin assembly which has a delicate and compact structure, is easy to use and is free from entanglement.

The present invention is completed as a result of various studies on the flow of the molten resin inside the mold and its moldability in order to solve the problems with the prior art described above, and aims at providing a method of producing a ultra-close contact tag pin assembly.

SUMMARY OF THE INVENTION

In a method of producing a crude material of a tag pin assembly, P, with filament portions 2 not yet stretched, comprising a plurality of tag pins p each comprising a head 1, a filament portion 2 and a transverse rod portion 3, and connected to one connecting rod 5 through connecting portions 4 in a comb shape, by injecting a molten synthetic resin into a mold having cavities C for said tag pin assembly P, the object of the invention described above can be accomplished by a method wherein the cavities for molding the crude material of the tag pin assembly P is connected to the connecting rod 5 described above through a main runner portion 30 connected to a molten resin flow passage of an injection molding machine, a large number of first sub-runner portions 31 branched from this main runner portion 30, second sub-runner portions 32 each connected to the first sub-runner portion 31 and branched into two runner portions, and gates 33 formed at the distal end of each second sub-runner portion 32, and the gates 33 are further connected to the intermediate positions between the connecting portions 4.

According to the conventional method of molding the tag pin assembly, the molten resin is charged while a large number of tag pins are connected to one connecting rod and moreover, from only one position of this connecting rod. In contrast, the production method of the present invention employs the construction such that the molten resin is charged into the cavities of the individual tag pins p through the second sub-runner portions 32 provided at half as many locations as the number of the tag pins p connected to one connecting rod 5, such as through 100 second sub-runner portions 32 when the number of tag pins p is 200, for example.

The basic technical conception of the present invention is to make uniform as much as possible the pressure in the flow passages of the molten resin and to charge the molten resin substantially simultaneously and moreover, at the same pressure, into the cavities of a plurality tag pins p. To attain this object, the present invention employs a cascade structure wherein the number of flow passages increases progressively by a multiplier of two, that is, 1,2, 4, ... and so on. In other words, the second sub-runner portions 32 are disposed in such a manner that one second sub-runner portion 32 eventually corresponds to two tag pins p, respectively.

According to the construction described above, the molten resin flowing from the main runner portion 30 is first branched to the first sub-runner portions 31, each first sub-runner portion 31 is branched into two flow passages at each second sub-runner portion 32 and furthermore, each second sub-runner portion 32 is branched so that the molten resin flows into the cavities of the two tag pins p.

Accordingly, the molten resin inflowing from the main runner portion 30 flows into the cavities of a plurality of tag pins p after repeating bifurcating, and the molten resin can flow into the cavities of the tag pins p substantially simultaneously under substantially the same condition. The basic conception of the present invention is to make uniform adjacent flows of the molten resin by repeating division of the flows of the fluid and to thereby make uniform the pressure.

Since the molten resin flows simultaneously into the individual cavities, the pressures substantially equal to one another act on both sides of the thin walls defining the cavities. Accordingly, a force that destroys this wall hardly occurs.

Accordingly, the tag pin assembly P having the tag pins p arranged in a close contact state can be molded, and even when such a precision mold is used, the mold has sufficient durability and can produce efficiently the tag pin assembly having the tag pins arranged in the ultra-close contact state.

It is advisable in practicing the present invention to make the main runner portion 30 sufficiently thick and to progressively decrease its section from its connection portion to the spool 8 towards its distal end, so as to make uniform the flow velocity of the molten resin. It is also advisable to make the section of the first sub-runner portion 31, which is connected to the main runner portion 30, by far smaller than the section of the main runner portion 30 and to make the section of the second sub-runner portion 32 connected to this first sub-runner portion smaller than the section of the first sub-runner portion 31.

The molten resin is charged into the cavities for molding the tag pin R through the connecting portions 4 while keeping the balance of the inflow resistance between the second sub-runner portions 32 and the connecting rod 5 through the gates 33, that is, the members which plays the role of a kind of throttles.

Since one of the sides of the second sub-runner portion 32 is connected to the intermediate positions of the two connecting portions 4, 4, four connecting portions 4 are equidistantly connected to one second sub-runner portions 32. The second sub-runner portion 32 is disposed on one of the sides of the connecting rod 5 and the connecting portion 4 connected to the cavity of the tag pin p is disposed on the other side, but the flow passages are so shaped as to form gentle curves equidistantly and to permit fluidization of the molten resin with a good balance.

The present invention will become more apparent from the following description when taken in conjunction with the accompanying drawings.

DESCRIPTION OF THE PREFERRED EMBODIMENTS

Hereinafter, preferred embodiments of the present invention will be explained with reference to the accompanying drawings.

Figure 1:
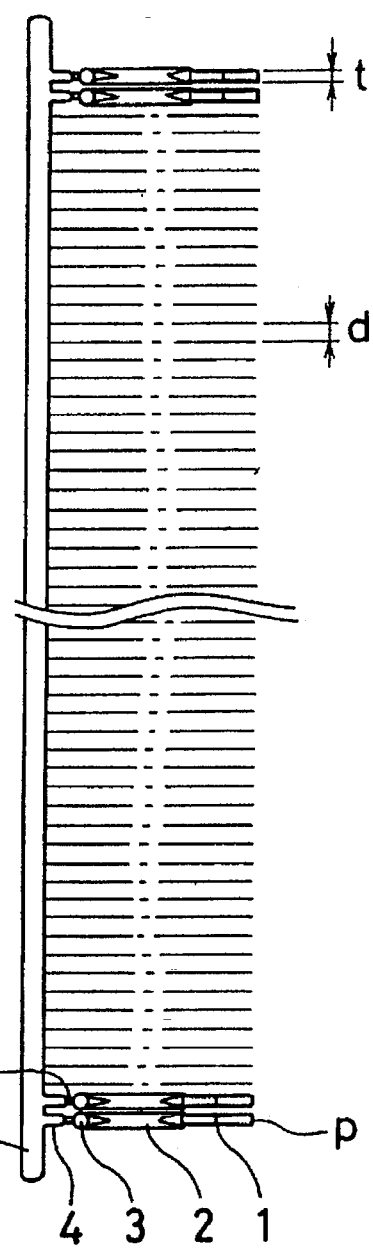
FIG. 1 is a front view of a crude material under the condition where a filament portion of a tag pin assembly is not yet stretched.
Figure 2:
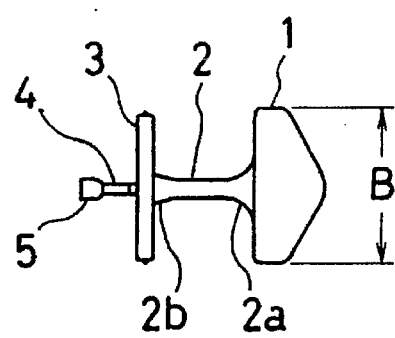
FIG. 2 is a side view of the crude material.

FIG. 1 is a front view of a crude material under the condition where a filament portion 2 of a ultra-close contact type tag pin assembly is not yet stretched, and FIG. 2 is a side view of FIG. 1. A tag pin p comprises a head 1, a filament portion 2 and a transverse rod portion 3, and is implanted in a comb shape to a connecting rod 5 through a connecting portion 4.

Figure 3:
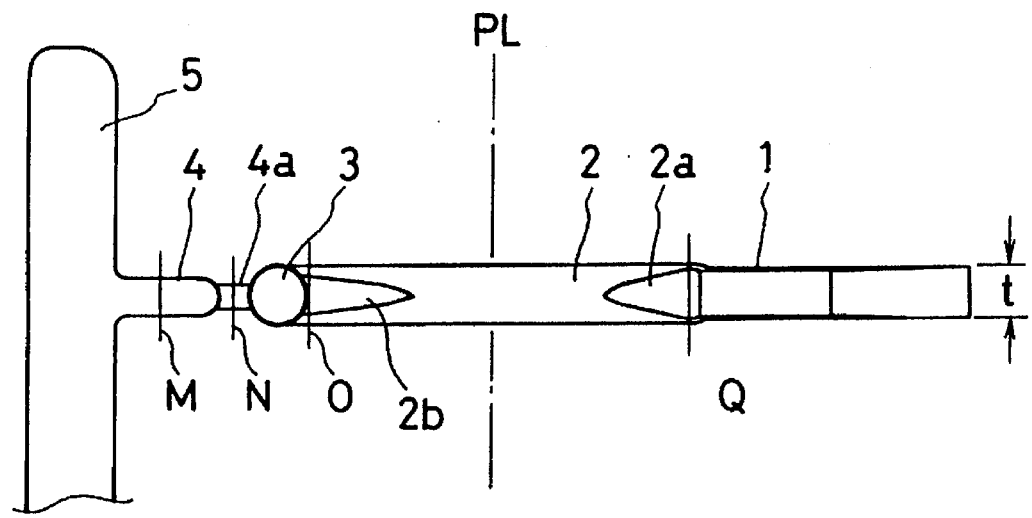
FIG. 3 is a front view showing in enlargement the principal portions of the crude material.
Figure 4:
FIG. 4 is a sectional view of a portion M in FIG. 3.
Figure 5:
FIG. 5 is a sectional View of a portion N in FIG. 3.
Figure 6:
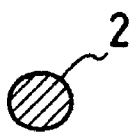
FIG. 6 is a sectional view of a portion O in FIG. 3.
Figure 7:
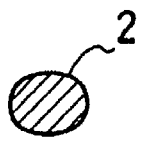
FIG. 7 is a sectional view of a portion Q in FIG. 3.
Figure 9:
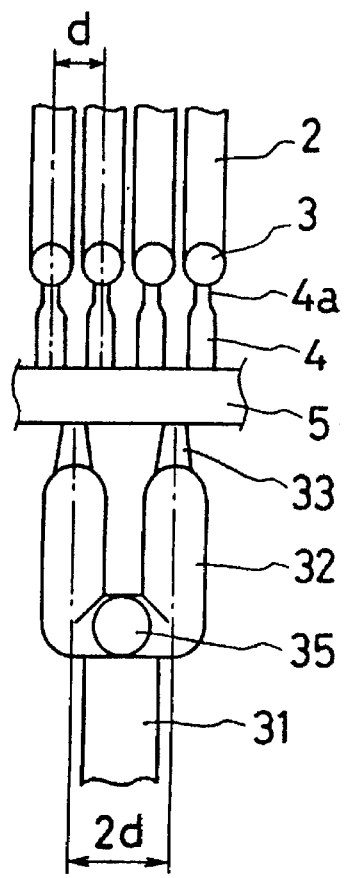
FIG. 9 is a front view showing in enlargement the principal portions of a flow passage of a resin.

A reduced portion 4a is formed at the part of the connecting portion 4 close to the connecting rod 5 as shown in FIGS. 3 and 5, and the tag pin can be easily cut off by putting a knife provided to a fitting machine to this reduced portion 4a. The overall structure of this tag pin assembly is similar to that of the conventional tag pin assembly, but is different from the prior art tag pin assembly in that a pitch d as the distance between the centers of the tag pins p is by far smaller than that of the prior art as shown in FIG. 9

In the embodiment of the present invention, this pitch d is 1.2 mm and the assembly comprises 100 tag pins. The width B of the head 1 (see FIG. 2) is 9.62 mm and its thickness t (see FIG. 3) is 0.7 mm. The diameter of the transverse rod portion 3 is 1.0 mm and the diameter of the filament portion 2 is 0.95 mm. The gap between the transverse rod portions 3 and the gap between the filament portions 2 are only from about 0.2 to about 0.25 mm, respectively. Therefore, an "ultra-precision mold" must be used that could not have been accomplished by the conventional method for molding the tag pin assembly P.

FIG. 3 is a side view showing in enlargement the tag pin p. As can be seen from FIGS. 2 and 3, substantially triangular padding portions 2a, 2b are formed at both ends of the filament portion 2, so that the filament portion 2 is thick at both ends and is thin at the center.

Due to this shape of the filament portion 2, one of the molds moves from a parting line PL of the mold toward the other mold, and moves the head 1 side while holding the transverse rod portion 3 side, thereby stretching the filament portion 2. Since the mold on the side of the head 1 moves as indicated by the arrow, tension acts on the filament portion 2 and stretching starts at the intermediate part of the filament portion 2, and gradually moves towards the head 1 and the transverse rod portion 3. Incidentally, FIGS. 4, 5, 6 and 7 show the sections of portions M, N, O and Q of FIG. 3, respectively.

The reason why the section of the member is polygonal as shown in FIG. 5 is that it can easily escape from the cavity, and the reason why it is thin and flat as shown particularly in FIG. 5 is that the tag pin p can be easily cut off when it is driven by a fitting machine.

Figure 8:
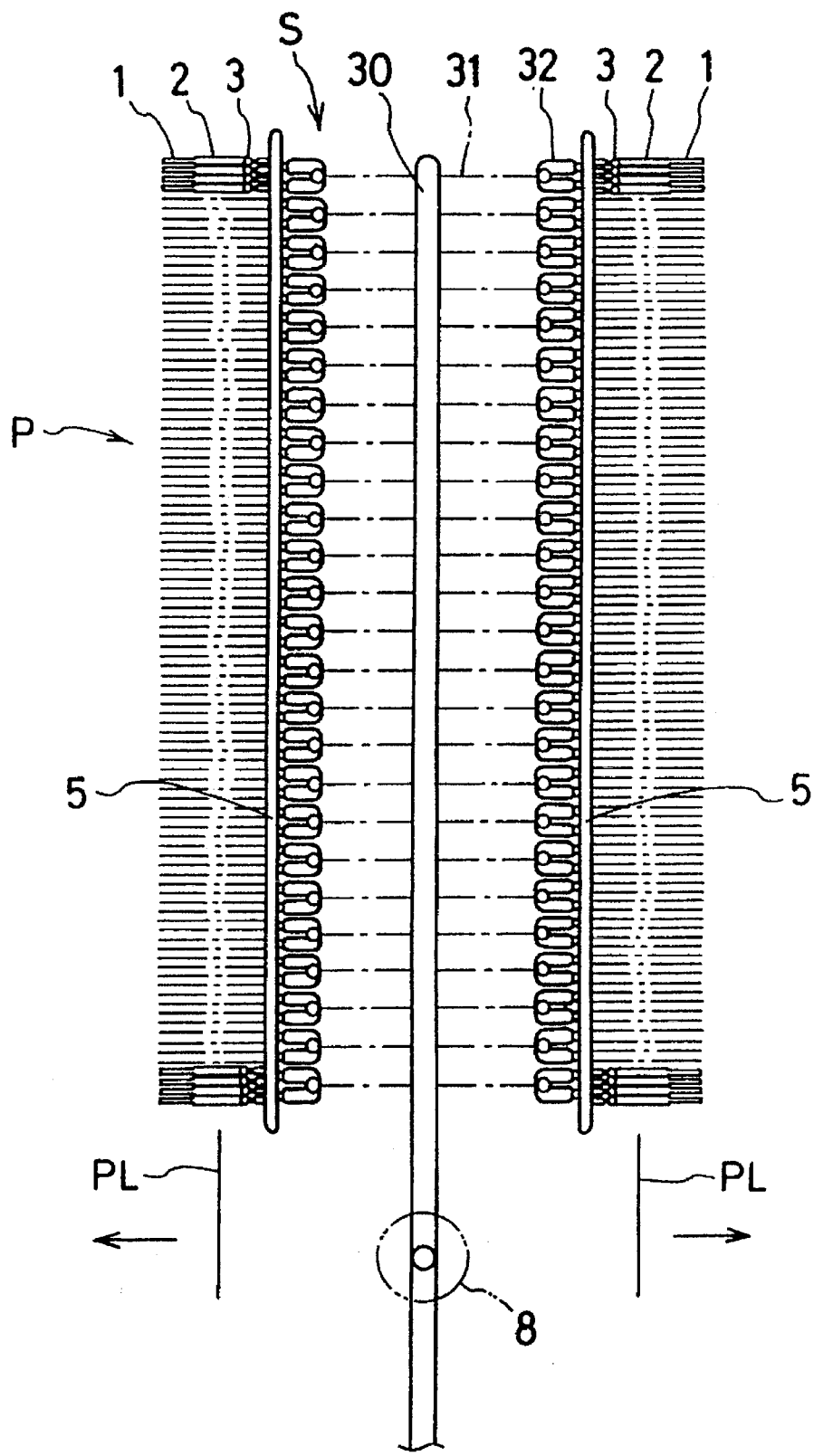
FIG. 8 is a front view of a mold for molding the tag pin assembly.

FIG. 8 is a front view showing the crude material of the tag pin assembly P or the cavity formed in the mold, and the cavity of the crude material of the tag pin assembly P is disposed in the reversed state on both sides of a main runner portion 30 that communicates with a spool 8. In this embodiment, four assemblies P having the same size are simultaneously molded at the right and left of the spool 8 and above and below the spool 8 as the center. The section of the spool 30 is progressively decreased from the root toward the distal end so that the flow velocity of a molten resin inside this spool 30 remains constant as much as possible.

FIG. 9 is an enlarged view of a portion near a second sub-runner portion 32, and shows the important portion of the present invention. A single first sub-runner portion 31 is extended to the right and left from the same position to both sides of a main runner portion 30 as shown in FIG. 8, and a bifurcate second sub-runner portion 32 is extended from the first sub-runner portion 31 as shown in FIG. 9, and is connected to the connecting rod 5 through a gate 33 formed at the distal end of this second sub-runner portion 32. A protruding portion 35 for receiving a protruding pin 36 is formed at the root of the second sub-runner portion 32 as shown in FIGS. 9 and 10.

One first sub-runner portion 31 and the second sub-runner portion 32 branched into the U shape are connected to the connecting rod 5 through the gates 33 formed at the distal end of each second sub-runner portion in the passage of the molten resin extending from the main runner portion 30 to the connecting rod 5. As shown in FIG. 9, each gate 33 is disposed at the intermediate position between the two connecting portions 4. One main runner portion 31 is connected to two second sub-runner portions 32, and these second sub-runner portions 32 are connected to the connecting rod 5 through the gates 33. Further, two connecting portions 4 are equidistantly disposed on the right and left of this gate 33. Accordingly, the resin is supplied from one first sub-runner portion 31 to the cavities of four tag pins p.

In the production of a practical mold, the section of the main runner portion 30 is progressively tapered from the root of the spool 8 as shown in FIG. 8, and the first sub-runner portion 31 as well as the second sub-runner portion 32 are preferably changed delicately in accordance with the distance from the spool 8 so as to obtain the balance between the velocity of the molten resin and the pressure.

Figure 10:
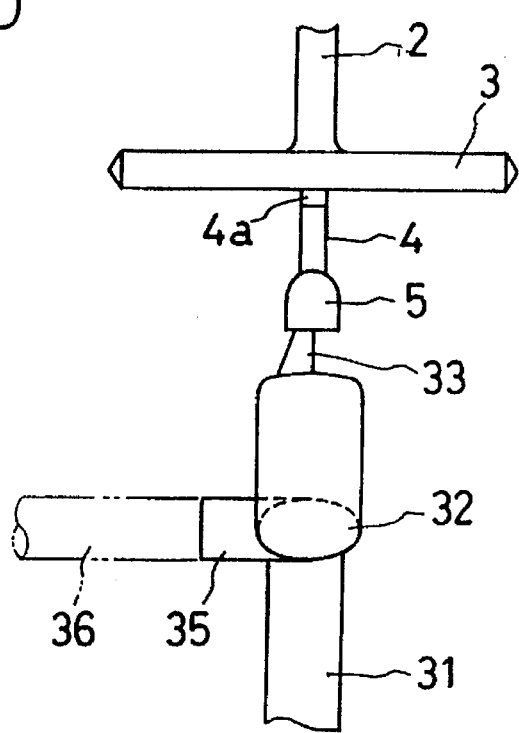
FIG. 10 is a side view showing a similar portion to that of FIG. 9.
Figure 11:
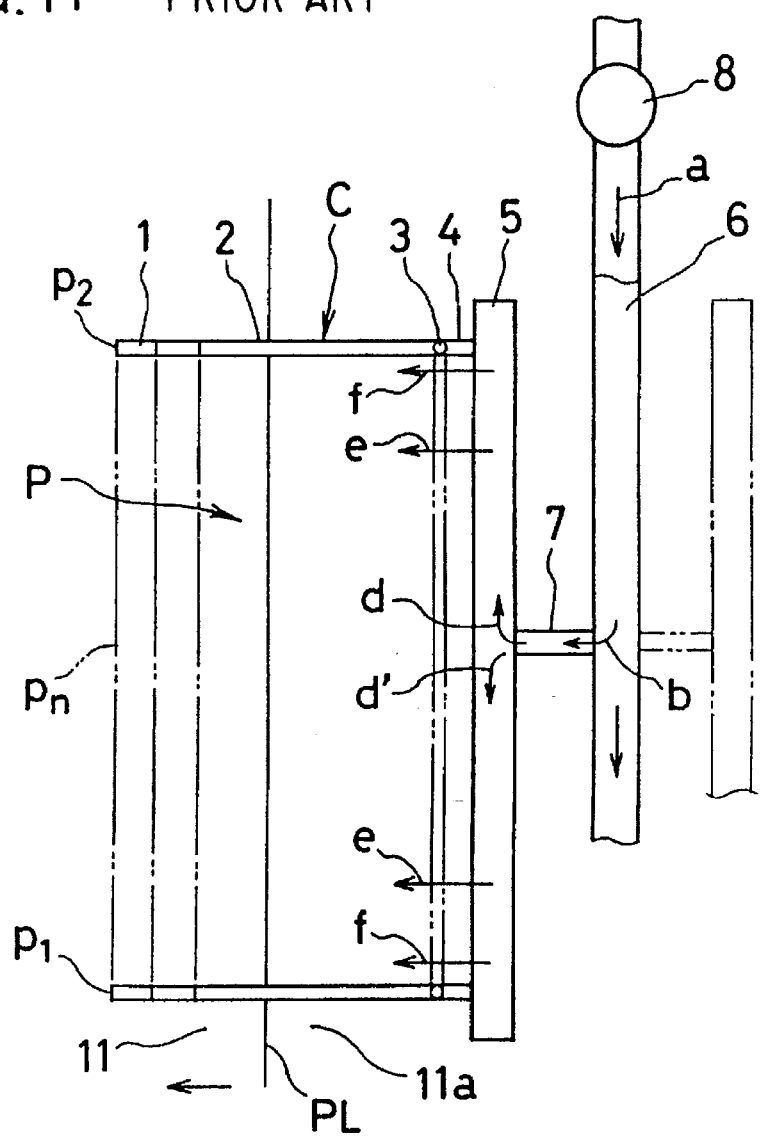
FIG. 11 is a front view showing a cavity of a mold according to the prior art.
Figure 12:
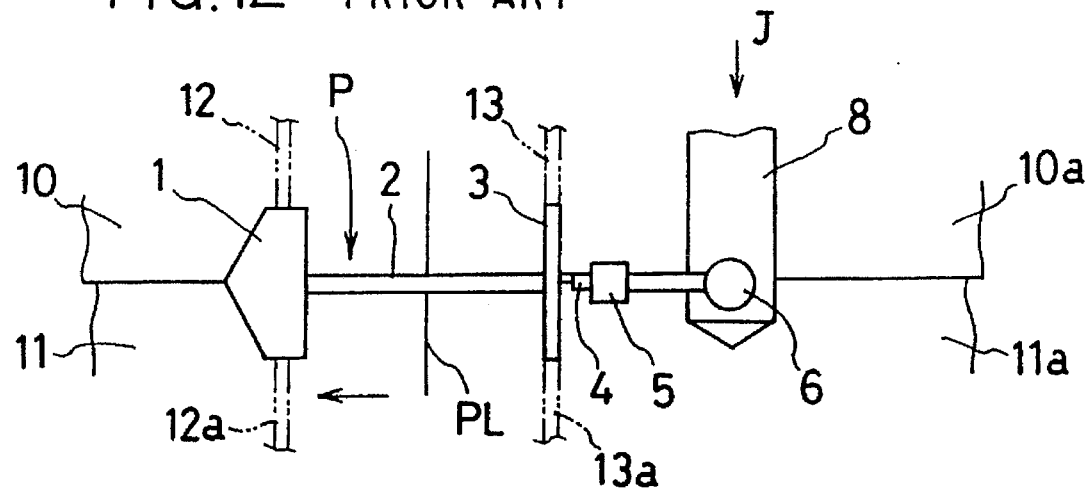
FIG. 12 is a sectional side view of FIG. 11.
Figure 13:
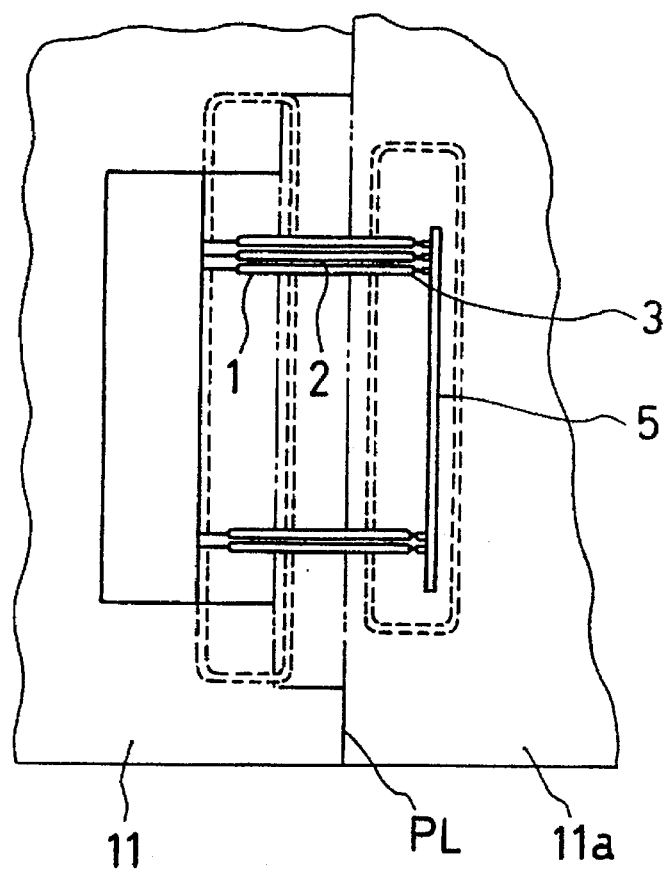
FIG. 13 is FIG. 5 of Japanese Patent Publication No. 45-37100.
Figure 14:
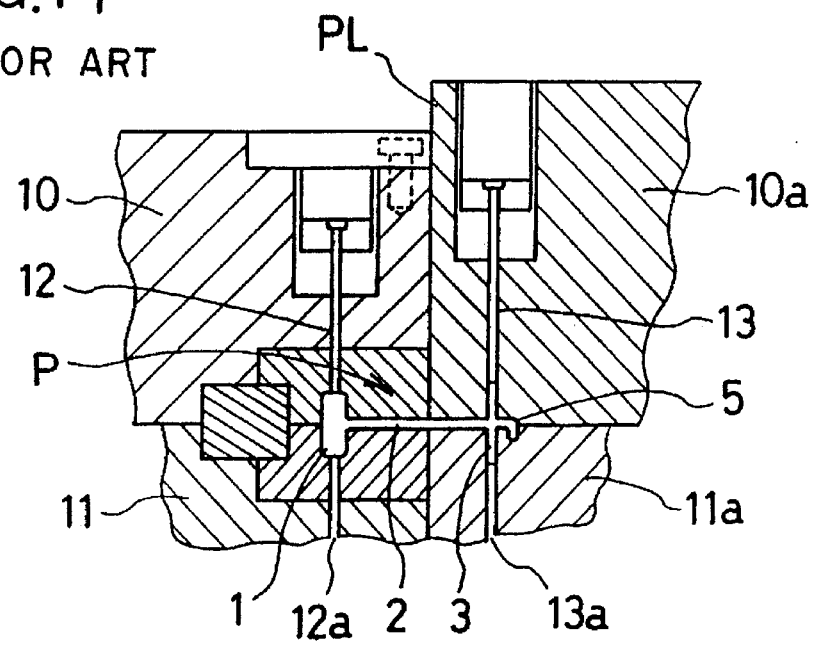
FIG. 14 is FIG. 6 of the Publication described above.
Figure 15:
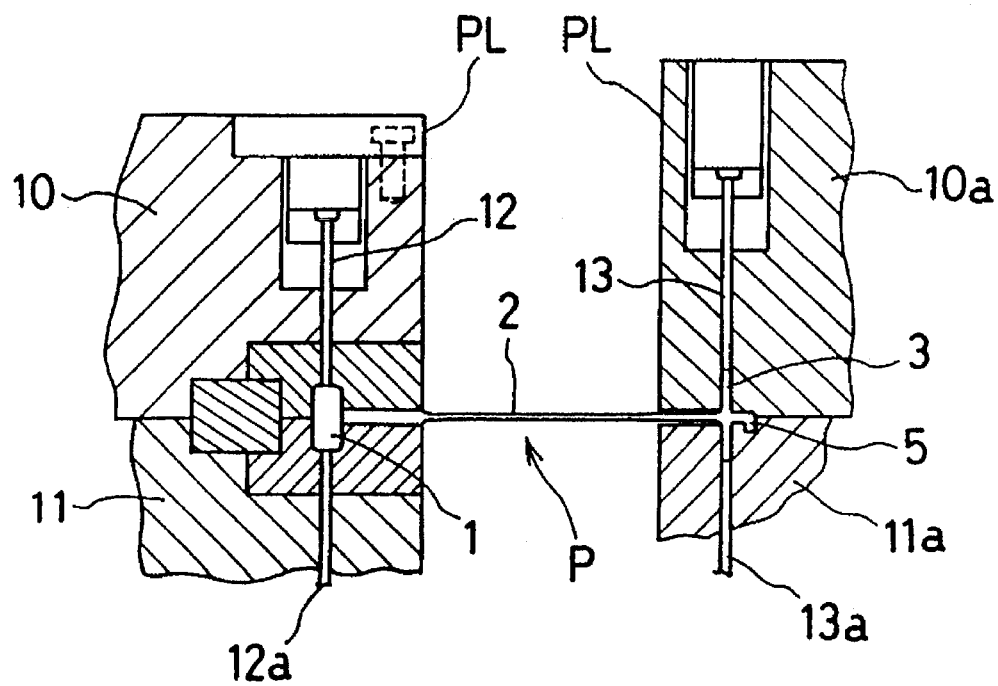
FIG. 15 is FIG. 7 of the Publication described above.
Figure 16:
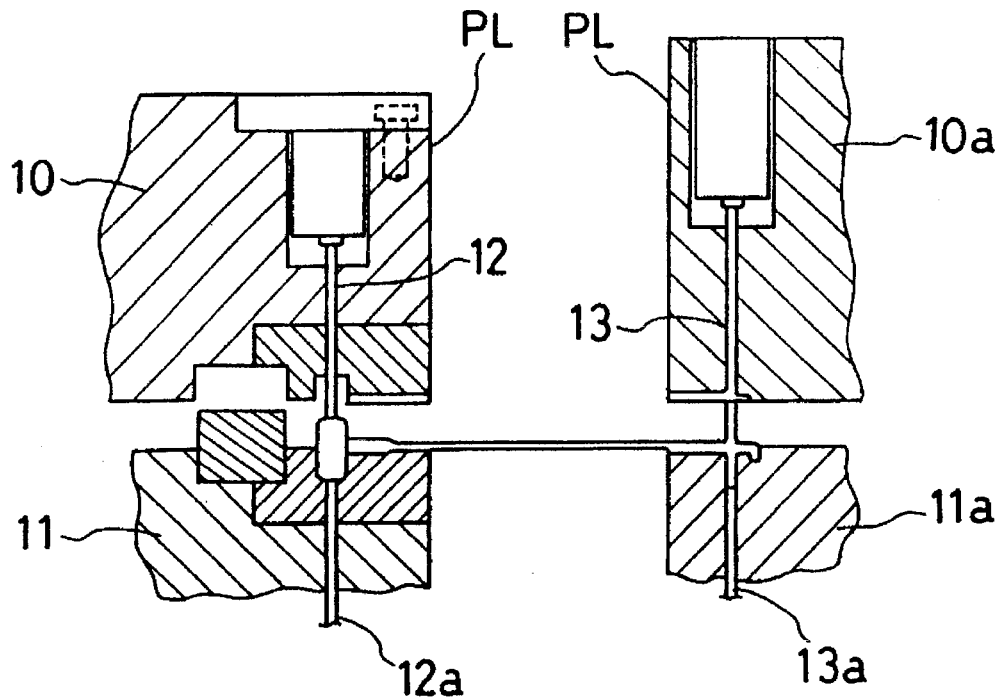
FIG. 16 is FIG. 8 of the Publication described above.

As can be understood from the comparison of FIGS. 8, 9 and 10 with FIG. 11, according to the prior art shown in FIG. 11, the molten resin is supplied by one sub-runner portion 7 to one tag pin assembly P, that is, to a large number of tag pins p. In contrast, according to the present invention, one second sub-runner portion 32 is connected to two tag pins p, one first sub-runner portion 31 is branched into the U-shape at the second sub-runner portion 32 and furthermore, one of the second sub-runner portions 32 is branched into two connecting portions 4 so as to inject the molten resin.

As can be understood from FIG. 8, a large number of second sub-runner portions 32 are connected to one connecting rod 5 having a large number of tag pins p implanted thereto, and the second sub-runner portions 32 and the main runner portion 30 are individually connected by the first sub-runner portions 31.

The present invention is characterized in that the molten resin is charged in the cascade system in which the spool 8, the first sub-runner portion 31, the second sub-runner portions 32 branched into the U-shape, the gates 33, the connecting rod 5 and the four tag pins p together provide repetition of bifurcating.

The present invention employs the construction wherein two tag pins p are finally connected to one gate 33 at the intermediate position, and when such a large number of gates 33 are disposed, balance can be obtained in the mold as a whole for fluidization of the molten resin. As a result, the pitch d of the tag pins p can be reduced to about 1.1 to 1.3 mm and moreover, the thickness of the wall defining the cavity at that time is extremely thin such as from 0.3 to 0.6 mm. Accordingly, the tag pin assembly P in the ultra-close contact state can be formed uniformly.

As described above, when the molten resin such as nylon is charged into the cavity C formed in the parting face of the four-split mold, the resin is solidified after the passage of a predetermined time. The filament portion 2 can be stretched and the outer diameter can be reduced by moving one of the molds (the mold on the side of the head 1) by a predetermined distance (2.5 to 4 times the original length of the filament portion 2) from the parting line PL as indicated by the arrow. At the same time, the strength can be improved, too.

After 5,000,000 precision tag pin assemblies P under the ultra-close contact state having a pitch of not greater than 1.2 mm were molded using the mold having such a resin flow passage, it was confirmed that no error occurred in the shape at the corner of the cavity and its dimension. It was empirically confirmed that when no abnormality was observed during 5,000,000 moldings, over 10,000,000 moldings could be sufficiently made.

The cavity for molding the crude material of the tag pin assembly P includes the main runner portion 30 connected to the molten resin flow passage of the injection molding machine, a large number of first sub-runner portions 31 branched from the main runner portion 30, the second sub-runner portions 32 each connected to the first sub-runner portion 31 and branched into two parts, and the gates 33 formed at the distal end of the second sub-runner portions 32, all of them being connected to the connecting rod 5 through the gates 33. Furthermore, the gate 33 is connected to the intermediate position between the connecting portions 4.

Accordingly, it becomes possible to dispose the tag pins in the "ultra-contact gap" state in the cavity, and hence to charge a high pressure molten resin into the ultra-precision mold having a by far thinner wall than the mold according to the prior art. Even though the thickness of the walls forming the cavity is small, a good balance can be established between the pressures acting on both sides of the wall because the molten resin is charged almost simultaneously to both sides of the wall. Accordingly, the thin wall is not broken and durability of the mold can be improved.

When the molten resin is charged to the filament portion 2 and the head 1 of the tag pin p, it is supplied in the cascade system from the first sub-runner portion 31 to the second sub-runner portions 32. In other words, the molten resin is supplied from one second sub-runner portion 32 to the two tag pins p, and the problem such as insufficient charging of the resin does not at all occur between the tag pins p.

According to the present invention, the tag pin assembly under the ultra-close contact state can be produced easily, and the heads of the tag pins do not entangle with one another during handling of the tag pin assembly. Further, since the length of the connecting rod is reduced, the tag pin assembly of the invention is easy to handle and compact.

The present invention can be suitably applied to an inter-mold stretching device capable of molding and stretching the filament portion 2 inside the mold, but can be likewise applied even when the molding step and the stretching step are separate from one another.

What is claimed is:

1. A method of molding a crude tag pin assembly formed in a comb shape with filament portions not yet stretched, said crude tag pin assembly comprising a plurality of tag pins, each including a head, said filament portion not yet stretched and a transverse rod portion, said transverse rod portion connected to a connecting rod through connecting portions, said method of molding comprising the steps of:

injecting a molten synthetic resin into a mold for said crude tag pin assembly from a molten resin flow passage of an injection molding machine, wherein said injecting step comprises:
passing said molten synthetic resin from said molten resin flow passage to a spool;
passing said molten synthetic resin flow from said spool to a main runner portion;
passing said molten synthetic resin flow from said main runner portion to a plurality of first sub-runner portions;
passing said molten synthetic resin from each of said first sub-runner portions to two symmetrically disposed second sub-runner portions;
passing said molten synthetic resin from each said second sub-runner portion to a gate formed at a distal end of each said second sub-runner portion;

passing said molten synthetic resin from said gate to said connecting rod; and passing said molten synthetic resin from said connecting rod to cavities for said plurality of tag pins through said connecting portions, wherein each gate being disposed at an intermediate portion between two connecting portions.

2. A method of molding a crude tag pin assembly according to claim 1, further comprising the step of passing said molten synthetic resin flow to one second sub-runner portion wherein said one second sub-runner portion is U-shaped and one first sub-runner portion from an intermediate portion of a root of said second sub-runner portion for cavities of four crude tag pins.

3. A method of molding a crude tag pin assembly according to claim 1, further comprising the steps of passing said molten synthetic resin flow to branch into a U-shape for said second sub-runner portions, passing said flow of molten synthetic resin to said gates through a section of a distal end of said second sub-runner portions, and passing the flow of the molten synthetic resin from said gates to said connecting rod.

4. A method of molding a crude tag pin assembly according to claim 1, further comprising the step of simultaneously passing the flow of the molten synthetic resin to said cavities for said tag pin assembly which are symmetrically and equidistantly on both sides of one main runner portion.

5. A method of molding a crude tag pin assembly according to claim 1, further comprising the step of passing the flow of molten synthetic resin to an intermediate position of a root of a U-shaped second sub-runner portion from an end portion of one first sub-runner portion which is connected to said main runner portion, and passing the flow of molten synthetic resin from a distal end of each said second sub-runner portion to an intermediate position between said connecting portions of two tag pins.

6. A method of molding a crude tag pin assembly according to claim 1, further comprising the steps of passing the flow of molten synthetic resin to a reduced portion formed at a distal end of each connecting portion connected to the connecting rod, and passing said flow to said tag pin through said reduced portion.

7. A method of molding a crude tag pin assembly according to claim 1, further comprising the step of passing said molten synthetic resin from one first sub-runner portion to one U-shape branched second sub-runner portion and then to two connecting portions and finally to cavities for said tag pins each connected to each of said connecting portions.

* * * * *